United States Patent [19]

Wilson

[11] Patent Number: 4,542,685
[45] Date of Patent: Sep. 24, 1985

[54] APPARATUS FOR MAKING FUNNEL CAKES USING A DEEP FRYER

[76] Inventor: Warren Wilson, 55 Saddle River Rd., Woodcliff Lake, N.J. 07675

[21] Appl. No.: 509,587

[22] Filed: Jun. 30, 1983

[51] Int. Cl.⁴ ............................................. A47J 37/12
[52] U.S. Cl. ........................................ 99/413; 99/415; 99/416; 99/418; 426/438; 426/523
[58] Field of Search ................ 426/438, 439, 523, 94; 99/403, 413, 415, 416, 418, 448

[56] References Cited

U.S. PATENT DOCUMENTS

| | | | |
|---|---|---|---|
| D. 236,414 | 8/1975 | Kroll | 99/413 |
| 839,307 | 12/1906 | Mitchell | 99/408 |
| 1,118,471 | 11/1914 | Carlton | 99/407 |
| 1,263,004 | 4/1918 | Tollagsen | 99/413 |
| 1,305,818 | 6/1919 | McFarland | 99/415 |
| 1,331,530 | 2/1920 | Shaw | 99/403 |
| 1,909,983 | 5/1933 | Powell | 99/415 |
| 2,186,855 | 1/1940 | Saccarini | 99/417 |
| 2,450,962 | 10/1948 | Hornkohl et al. | 99/409 |
| 2,767,641 | 10/1956 | Ackles | 99/406 |
| 2,997,566 | 8/1961 | Pierce et al. | 426/438 |
| 3,001,468 | 9/1961 | Hood | 99/407 |
| 3,508,485 | 4/1970 | Munsey | 99/412 |
| 4,006,675 | 2/1977 | Lill | 99/417 |
| 4,082,033 | 4/1978 | Fester | 99/406 |
| 4,230,238 | 10/1980 | Wilson | 99/348 |

*Primary Examiner*—George Yeung
*Attorney, Agent, or Firm*—Lowe, King, Price & Becker

[57] ABSTRACT

Funnel cakes are cooked in a pan assembly inserted in a deep fat fryer. A substantially solid bottom of the pan assembly is located ½-2 inches, preferably 1½ inches, below the surface of a hot liquid cooking oil bath in a vat of the fryer so that the batter, when continuously poured into the pan hits the solid bottom portion of the pan and rises in the oil to form a unitary mass that floats in the oil without sticking to the bottom. The unitary mass is confined by side walls of the pan assembly as the batter cooks and expands.

6 Claims, 6 Drawing Figures

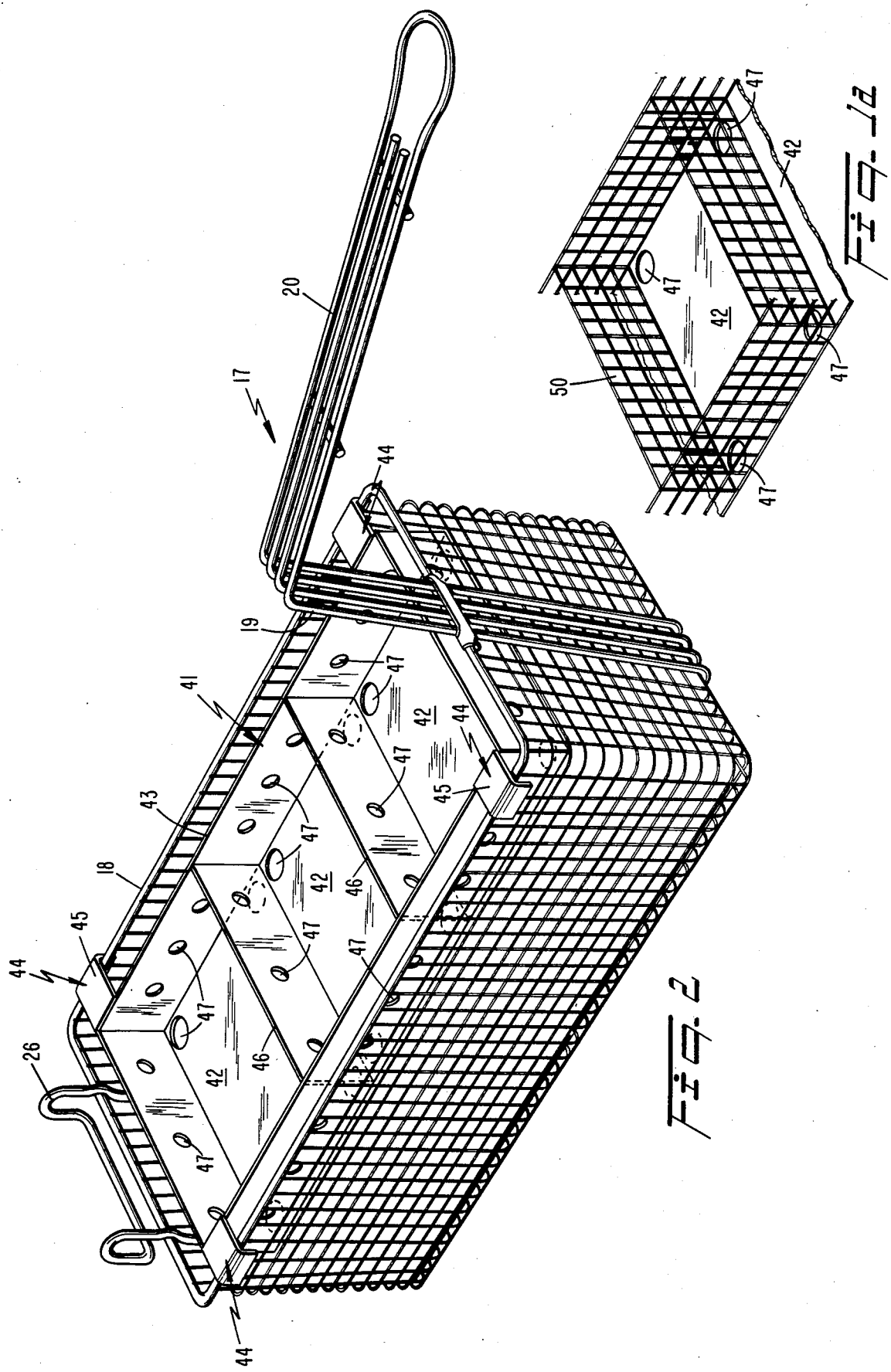

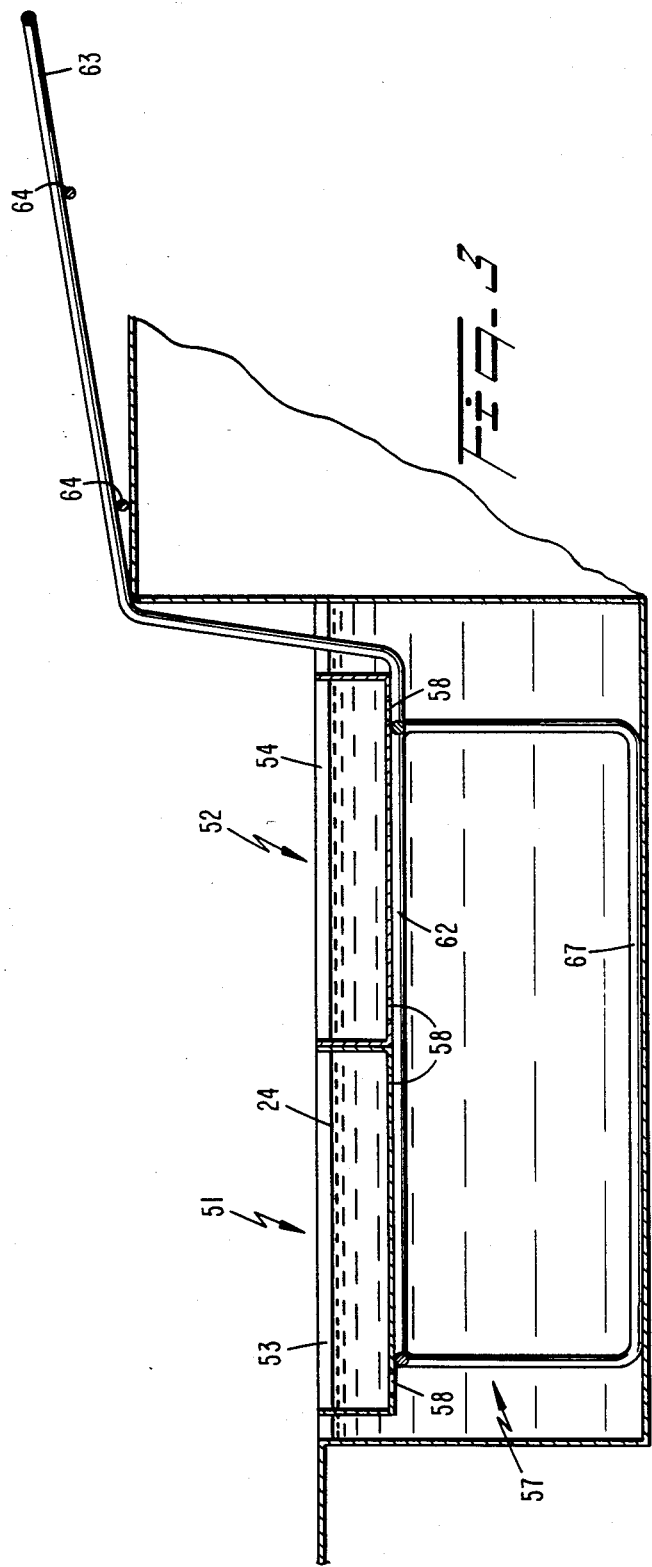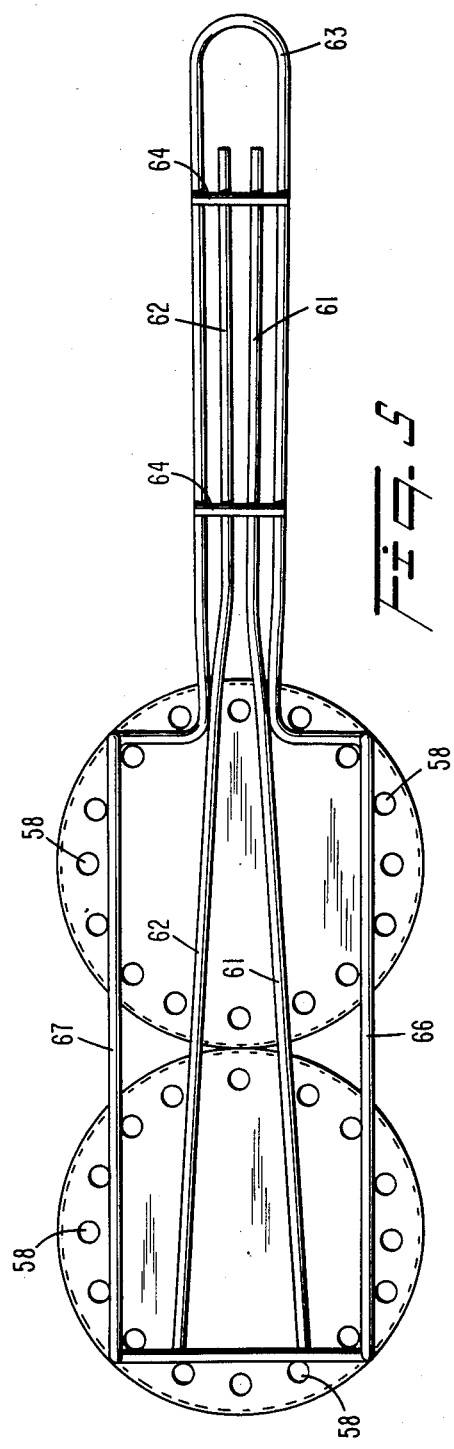

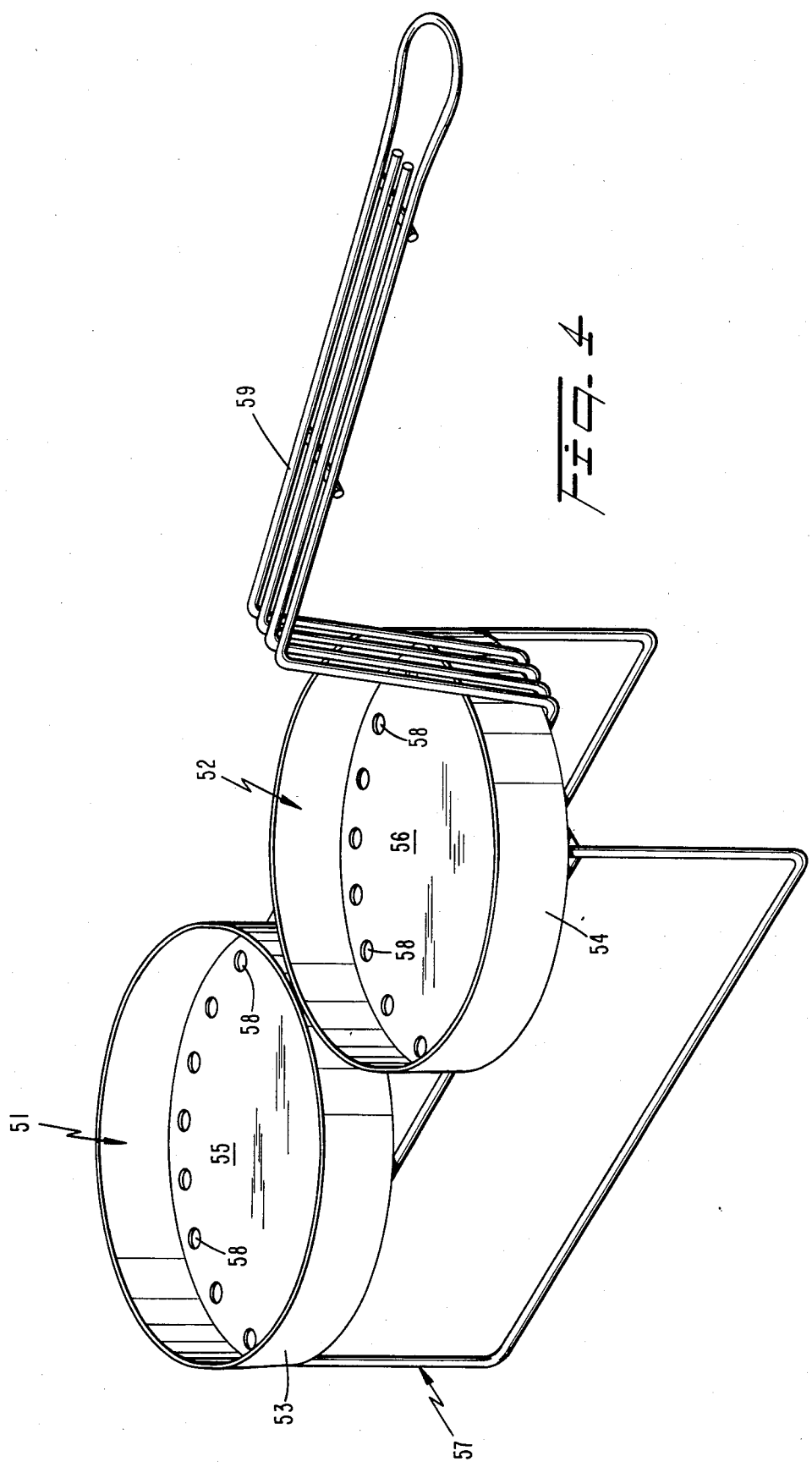

APPARATUS FOR MAKING FUNNEL CAKES USING A DEEP FRYER

TECHNICAL FIELD

The present invention relates generally to a method of and apparatus for cooking funnel cakes and more particularly to such a method and apparatus wherein the funnel cakes are cooked in a deep fat fryer.

BACKGROUND ART

Funnel cakes are a Pennsylvania Dutch bakery confectionary, traditionally formed by a homemaker pouring a batter including wheat flour, eggs, milk, leavening, salt and other materials into a skillet containing heated cooking oil. As the batter is dispensed through the funnel, the funnel is moved over the skillet so that a strand of the batter is formed in the skillet. The funnel is moved over the skillet in any desired free form so the strand forms an interlocking design, such as a spiral, star or web. The batter, as it cooks, swells to form a relatively flat cake, which is cooked on each side for approximately thirty seconds until it is evenly browned. The resulting funnel cake is removed from the skillet and frequently confectionary sugar, syrup, ice-cream or other materials are added.

Funnel cakes, with expanding popularity, have been commercialized into dry mix form. The dry mix typically includes wheat flour, sugar, dried whole egg, non-fat dry milk, leavening, salt and artifical flavor, but does not include yeast nor shortening, ingredients also missing from the traditionally formed funnel cakes. To the dry mix is added a measured quantity of water or other suitable, similar liquid. The dry mix-water mixture is mixed to form a batter that can be dispensed into the skillet by utilizing a funnel. In addition, the batter can be formed in and dispensed from a pitcher having a long spout. The batter is poured through the spout into a skillet or other cooking vessel containing heated cooking oil; a particularly suitable pitcher is disclosed in my U.S. Pat. No. 4,230,238. The funnel cake product has been cooked and sold in this manner at retail, for food service use. Alternatively the batter can be dispensed from a squeeze bottle, as disclosed in my co-pending application, Ser. No. 398,233, filed July 14, 1982, entitled "Apparatus For And Method Of Making Funnel Cakes".

Funnel cakes are traditionally a breakfast type food, similar to pancakes or waffles. However, funnel cakes have not usually been sold in restaurants, for breakfast use. Many restaurants, particularly fast food restaurants, are prime candidates to sell funnel cakes for breakfast and other meals, as well as snack purposes, because such restaurants have deep fat fryers of the type employed for frying french fried potatoes in a wire mesh basket. Because french fried potatoes are not cooked during the entire day and do not occupy the deep fat fryers all of the time, the deep fat fryers could be employed economically for cooking funnel cakes. Because some deep fat fryers include sufficient space for two adjacent wire mesh baskets, only one of which is needed for french fried potatoes, there is unused space that can be used to make funnel cakes. However, deep fat fryers as presently constituted are not suitable for making funnel cakes because the fryers are located in a vat having a height of 6 inches or more, containing a hot cooking oil bath having a similar depth.

To make a funnel cake properly, the funnel cake must be poured into a pan having hot liquid cooking oil to a depth of between ½ to 2 inches, preferably approximately 1½ inches. The maximum 2 inch depth is necessary to assure that when the batter is continuously poured into the oil, a floating unitary mass is formed in the oil. If the hot liquid cooking oil has a depth in excess of 2 inches, the batter does not form a unitary mass because it has a tendency to striate, i.e., to form a number of different, generally parallel layers at different depths in the oil. The striation causes the funnel cake batter to form a number of individual strands or globules, rather than a unitary mass. Such striation is prevented by limiting the depth of the hot liquid cooking oil to 2 inches because at that depth range, the batter as it is poured into the pan hits the bottom of the pan and then rises in the oil to a level to form a unitary mass. The ½ inch minimum cooking oil depth prevents the batter from sticking to the bottom of a cooking vessel in which the funnel cake is being prepared.

Conventional deep fat fryers are also not completely suited for cooking funnel cakes because the funnel cakes have a tendency, as they are cooked, to expand. Such expansion may prevent formation of a unitary mass. The dimensions of generally available deep fat fryers are such that the batter, as it cooks, is likely to expand excessively, causing the finished product to be susceptible to breakage. It is, thus, necessary to confine the funnel cake, as it is being cooked.

It is, accordingly, an object of the present invention to provide a new and improved method of and apparatus for cooking funnel cakes.

Another object of the present invention is to provide a new and improved method of and apparatus for cooking funnel cakes by using deep fat fryers.

Another object of the present invention is to provide a method of and apparatus for cooking funnel cakes in restaurants having deep fat fryers that are used for cooking various foods during non breakfast periods, and wherein the fryers can be modified for cooking funnel cakes during breakfast periods.

A further object of the invention is to provide an apparatus for and method of cooking funnel cakes in a deep fat fryer such that the funnel cake batter, when cooked, forms a unitary mass.

DISCLOSURE OF INVENTION

In accordance with the present invention, a method of cooking funnel cakes comprises inserting a pan having a bottom and sides into a deep fat fryer having hot liquid cooking oil in it. The pan bottom has substantial solid portions. The pan is located in the liquid to a depth so that the liquid covers the bottom but top edges of the sides are above the level of the liquid. Funnel cake batter is poured in a continuous motion into the hot liquid between the sides of the pan. The pan bottom is at a depth in the oil such that the batter, as it is continuously poured into the pan, hits the solid bottom portion of the pan and rises in the oil to form a unitary mass that floats in the oil without sticking to the bottom and is confined by the side portions as it expands. The unitary mass is cooked as it floats in the oil in the pan. The unitary mass is removed from the pan as the finished funnel cake product. The desired result is achieved by inserting the pan in the oil so the bottom of the pan is from ½ inch to 2 inches, and preferably approximately 1½ inches, below the oil surface.

In accordance with another aspect of the invention, an apparatus for cooking funnel cakes comprises a deep fat fryer, in combination with a pan assembly having a bottom and sides located in the fryer. The pan assembly is selectively inserted into and removed from the fryer. The bottom has substantial solid portions. At least one of the bottom and sides is perforated so that the liquid drains from the pan assembly into the fryer when the pan assembly is removed from the fryer and to facilitate insertion of the pan assembly into the fryer. A means is provided for controlling the height of the bottom of the pan assembly relative to the surface of hot liquid cooking oil in a vat of the fryer so that the liquid covers the bottom but top edges of the sides are above the level of the liquid. The depth of the bottom of the pan assembly in the oil is such that the batter, when continuously poured into the pan, hits the solid bottom portion of the pan and rises in the oil to form a unitary mass that floats in the oil without sticking to the bottom and is confined by the solid side portions as it expands. The sides of the pan assembly may be solid with appropriate apertures or may be formed of wire mesh. The wire mesh allows a rapid transfer of liquid from the vat to the funnel cake so that any tendency for the funnel cake batter to cool the liquid oil in proximity with it is substantially overcome.

In one embodiment, the deep fat fryer includes a perforated basket adapted to be inserted into the fryer vat. The height controlling means for the pan assembly includes hangers on the pan assembly, which hangers are selectively connected to a top edge of the perforated basket to hold the pan assembly in place on the basket. The basket is generally shaped as a parallelepiped having an open, rectangular top. The bottom of the pan assembly has a substantial rectangular shape generally corresponding with the shape of the open top of the basket and dimensioned to be slightly smaller than the open top so that the pan assembly can fit into the open top. The pan assembly sides include exterior walls and at least one vertical divider between adjacent segments of the pan assembly where individual funnel cakes are formed. The vertical divider extends at right angles between a pair of parallel exterior walls of the pan assembly.

In a second embodiment, the pan assembly includes plural individual circular pans having abutting secured side portions. Instead of using hangers the height controlling means may include legs fixedly attached to the pan assembly, wherein the legs have bottom portions that engage a floor of the vat.

A particular advantage in the use of deep fat fryers is that the temperature of the cooking oil is controlled quite accurately, in contrast to oil temperature control prolems that can arise in cooking funnel cakes in a skillet. Funnel cakes are desirably cooked at a temperature between 375° F. and 400° F. If the cooking oil temperature exceeds 400° F., serious smoking and occasional grease fires may occur, while temperatures less than 375° F. may cause delays in cooking.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

FIG. 1a is a partial perspective view of a pan assembly of the present invention;

FIG. 2 is a perspective view of the basket of FIG. 1, in combination with the insert;

FIG. 3 is a side view of a second embodiment of the invention wherein a pair of abutting pans mounted on legs are inserted in a deep fat fryer vat; and FIGS. 4 and 5 are respectively perspective and bottom views of the second embodiment.

BEST MODE FOR CARRYING OUT THE INVENTION

Figure 1:
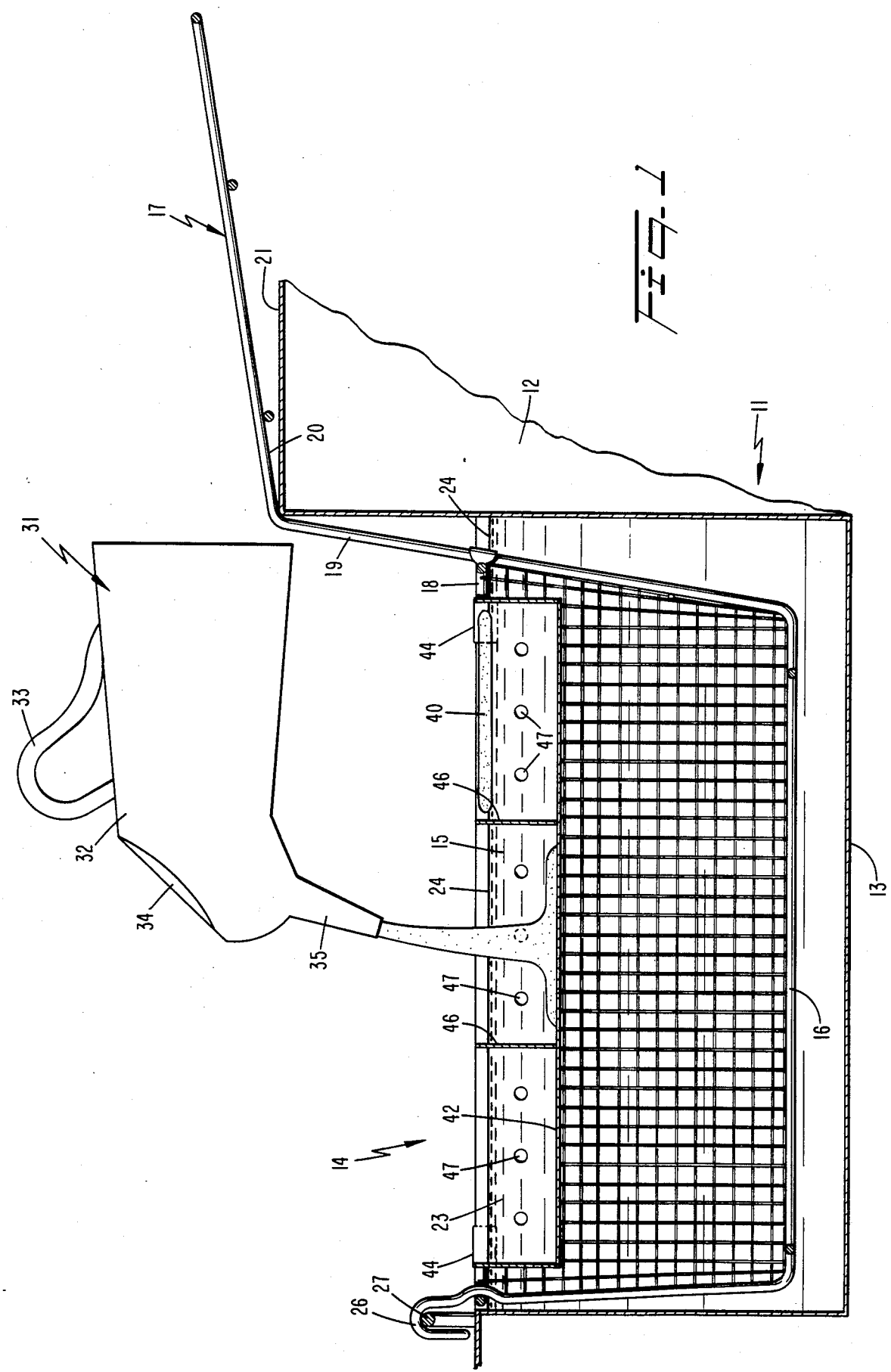
FIG. 1 is a side sectional view of one embodiment of the invention wherein an insert is provided in a french fry cooking basket inserted in a deep fat fryer vat.

Reference is now made to FIG. 1 of the drawing wherein a deep fat fryer vat 11, having side walls 12 and bottom 13 is illustrated in sectional view, in combination with a conventional deep fat fryer french fry potato cooking basket 14, having a generally parallelipiped configuration with an open top. Basket 14 includes the usual wire mesh, screen like inwardly sloping side walls 15 and flat bottom 16, as well as handle 17 which extends above top edge 18 of the basket, from one end of the basket. Handle 17 includes vertically and horizontally extending portions 19 and 20, whereby the bottom of horizontal portion 20 engages top face 21 of a counter in which vat 11 is located, to hold basket 14 in situ in the vat and assist in controlling the height of the basket in the vat. Basket 14 is also held in place with a hook 26 on the end thereof opposite from handle 17, which hook engages rod 27 in vat 11. Vat 11 includes hot liquid heating oil bath 23 having an upper surface 24, slightly below the basket top edge 18. The apparatus described previously in connection with FIG. 1 is conventional, typically used in restaurants, particularly of the fast food type for deep fat frying of various food products, particularly french fried potatoes.

In accordance with the present invention, the prior art deep fat fryer apparatus is modified so that it can be used to cook funnel cakes, from a funnel cake batter. In commercialized form, as typically would be used for restaurant and other food service purposes, the funnel cake batter is prepared from a dry mix, typically including wheat flour, sugar, dry whole eggs, non-fat dry milk, leavening, salt and artifical flavor, without yeast nor shortening. To the dry mix is added a measured quantity of water or other suitable, similar liquid. The dry mix-water mixture is mixed to form a batter.

For foot service applications, the batter is typically placed in funnel pitcher 31, preferably of a type similar to that disclosed in my U.S. Pat. No. 4,230,238, or a squeeze bottle as disclosed in my previously mentioned co-pending application Ser. No. 398,233. Pitcher 31 typically includes a unitary polyethylene body 32, having a handle 33. Body 32 includes an opening 34 through which the dry mix and liquid are initially poured or through which the batter is initially poured. The batter is mixed in body 32 and is poured from spout 35 into the hot cooking oil bath 23 in vat 11, between the confines of basket 14.

To make funnel cakes in vat 11, within the confines of basket 14, pan assembly 41 is placed in the basket. To withstand the heat of cooking oil bath 23 and provide maximum sterility, pan assembly 41 is preferably formed of stainless steel or another appropriate metal.

Pan assembly 41 includes flat bottom portion 42 and side portion 43. Wall portion 43 is fixedly secured to the edges of bottom portion 42, so that the wall portion projects upwardly, at right angles to the bottom portion. Pan assembly 41 is constructed so that bottom portion 42 is shaped as a rectangular panel similar to the shape of the open top of basket 14; bottom portion 42 has an area slightly less than the area of the open top of the basket, so that the pan means can fit into the basket while providing maximum surface area for funnel cakes cooked therein.

Bottom portion 42 is maintained in a predetermined range below the surface 23 of hot cooking oil bath 23 in vat 11. In particular, flat bottom portion 42 is maintained somewhere in the range of ½ inch and 2 inches below surface 24, preferably 1½ inches below the surface. To these ends, pan means 41 is provided with hangers 44, in proximity to each of the four corners of the rectangularly shaped pan means. Each of hangers 44 is fixedly mounted on wall portion 43 and includes an ear 45 that extends away from the remainder of pan means 41, to engage top edge 18 of basket 14. The four hangers are connected to pan means 41 and mounted on basket 14 in such a way as to maintain flat bottom portion 42 in a generally horizontal plane.

Pan assembly 41 is divided into three segments in the illustrated embodiment by a pair of mutually parallel vertical divider walls 46 which extend transversely to the length of bottom portion 42, to divide the bottom portion into three separate pans having approximately equal area, in which three funnel cakes can be simultaneously cooked. In FIG. 1, batter is illustrated as being poured into the center pan of pan assembly 41, against the solid bottom portion 42, while cooking, previously poured funnel cake 40 is illustrated as floating in the right pan of pan assembly 41. Dividers 46 thus are considered as part of the wall means, as are the exterior walls at the periphery of bottom portion 42.

To enable pan assembly 41 to be easily inserted into basket 14, even when the basket includes cooking oil, and to enable the cooking oil to drain from the pan assembly back into vat 11 when the pan assembly is removed from the vat, drainage apertures 47 are provided along the length of the exterior wall portion 43 and the interior wall dividers 46, as well as in all four corners of bottom portion 42 in each of the three individual pans formed in pan assembly 41. Each of the twelve drainage apertures 47 in bottom portion 42 has an area considerably greater than the area of each individual drainage aperture in side wall portion 43 to facilitate drainage of liquid from pan assembly 41. The number and area of drainage apertures 47 in bottom portion 42, however, are small enough and the locations of the bottom portion apertures are such that the vast majority of the bottom portion can be considered as solid to enable the poured batter to hit the bottom portion to form a unitary mass. Similarly, the number and area of drainage apertures 47 in wall portion 43 are such that the side wall portion can be considered as substantially solid. It is important for bottom and side wall portions 42 and 43 to be substantially solid so that when funnel cake batter is continuously poured into one of the three individual pans of pan assembly 41 a funnel cake having a unitary mass is formed. Otherwise, the batter is likely to form globules that are not appealing to the consumer.

Alternatively, the batter confining side walls of pan assembly 41 can be formed of a wire mesh as illustrated in the partial perspective view of the pan assembly illustrated in FIG. 1a. Wire mesh side wall 50 is fixedly secured to the solid bottom 42 of pan assembly. Wire mesh side wall 50 facilitates the flow of hot cooking oil from bath 23 to the cooking batter to obviate any tendency for the batter to cool oil confined to the interior of the relatively solid pan of FIG. 1, as the funnel cakes are cooked at a high through put rate.

To cook a single funnel cake, batter in pitcher 31 is poured through spout 35 into an individual pan of pan assembly 41, as the pitcher is continuously moved and held in the pouring position over the individual pan. The pitcher is moved to enable any desired pattern of funnel cake batter to be formed in cooking oil 15. When the batter is poured from spout 35, it hits bottom portion 42 and is deflected upwardly in cooking oil 15. The batter expands and floats in cooking oil 15. The expanding, cooking batter is confined by side wall portions 43, including divider or dividers 46. The floating cooking funnel cake can not expand beyond the individual pan into which the batter is poured because side wall portions 43 extend above top surface 24 of cooking oil bath 23.

To enable the cooking, expanding funnel cake to be a unitary mass, it is necessary for bottom portion 42 to be between ½ inch and 2 inches below surface 24. If bottom portion 42 is more than 2 inches below surface 24, all of the batter poured from spout 35 through cooking oil 23 does not reach the bottom portion, to be deflected from it. Thereby, as pitcher 31 is moved over the individual pan, different portions of the batter would have a tendency to reach different levels within cooking oil 23, causing striation of the batter. Striation of the batter at different levels in cooking oil 23 prevents the formation of a unitary mass of batter. It is necessary for at least one-half inch of cooking oil 23 to be above bottom pan portion 42 to prevent sticking of the poured batter onto the bottom portion. It has been experimentally determined that the optimum level for bottom portion 42 below surface 24 is 1½ inches. The chef must, therefore, be somewhat careful to maintain the level of surface 24 in the ½–2 inch range.

As the funnel cake batter is being cooked, oil bath 23 is maintained in a range of between 375° F. and 400° F. by conventional heat control means of the type usually employed in deep fat fryers. If the temperature of oil 23 exceeds 400° F., serious smoking and occasional grease fires are likely to occur. Temperatures of oil 23 less than 375° F. may prevent the funnel cake from being properly cooked or substantially increase the time required for cooking with an adverse effect on taste.

When it is no longer desired to cook funnel cakes, for example, because the breakfast period is over and it is necessary to use the deep fat fryer for other purposes, such as cooking french fried potatoes, basket 14 is removed from deep fat fryer vat 12. Basket 14 is allowed to cool so that the basket and pan assembly 41 can be handled. When basket 14 and pan assembly 41 have cooled sufficiently to be handled, the pan assembly is removed from the basket merely by grasping hangers 44 and lifting the hangers and pan assembly from the basket. The pan assembly is stowed until it is desired again to cook funnel cakes, at which time the pan assembly is reinserted into basket 14 by grasping hangers 44 and lowering the pan assembly into the basket so that the hangers engage the basket top edge 18.

Reference is now made to FIGS. 3, 4 and 5 of the drawing, wherein there is illustrated a second embodiment of the invention which does not require the use of basket 14 and enables funnel cakes of a more conventional, circular shape to be optimally cooked in a deep fat fryer.

In the embodiment of FIGS. 3, 4 and 5, the pan assembly includes circular pans 51 and 52, respectively having abutting side walls 53 and 54 and flat, co-planar, horizontally extending bottom panels 55 and 56 are mounted on leg structure 57. The bottoms of leg structures 57 abut against bottom 13 of deep fat fryer 11, to control the depth of flat bottom portions 55 and 56 below the surface of cooking oil 24 to the stated range of between ½ inch and 2 inches. To facilitate insertion and removal of pans 51 and 52 into oil bath 23, pan bottom panels 55 and 56 include peripheral drainage apertures 58; if necessary or desired, drainage apertures can also be formed in side walls 53 and 54 or the side walls can be formed of a wire mesh similarly to that illustrated in FIG. 1a. As in the embodiment of FIGS. 1 and 2, the number, area and location of the drainage aperture are such that the poured funnel cake batter forms a unitary mass. Insertion and removal of pans 51 and 52 are also facilitated by handle 59, constructed in a manner similar to conventional handle 17 on basket 14, and fixedly attached to the structure of FIGS. 3–5 so that it extends generally adjacent a portion of side wall 54 remote from the abutting segments of walls 53 and 54.

Legs 57 and handle 59 are preferably formed of metal rods bent into an appropriate shape and secured to each other, as well as to the pans. To these ends, legs 57 and handle 59 are formed of a matrix of metal rods 61–67. Rods 61 and 62 are central rods, forming interior horizontally extending portions of handle 59 that also includes exterior parallel strands of rod 63; in handle 59, rods 61–63 are co-planar. At the end of handle 59 adjacent pan 52, rods 61 and 62 are bent vertically so as to extend below pans 51 and 52. Below pans 51 and 52 rods 61 and 62 are bent horizontally to project underneath and parallel to panels 55 and 56. The portions of rods 61 and 62 which extend underneath and parallel to panels 55 and 56 are tapered outwardly, and extend completely below pan 52, and below the vast majority of pan 51.

Rod 63 is bent in a semi-circle at the end of handle 59 remote from pan 52, and thence proceeds towards pan 52 in a generally horizontal plane, as two parallel strands. In proximity to pan 52, two parallel strands of rod 63 are bent vertically so that they are substantially co-planar with rods 61 and 62 and extend below panels 55 and 56. Below panels 55 and 56, rods 61 and 62 are bent horizontally to extend below and abut against the panels. The portions of rods 61–63 proximate the edge of pan 52 adjacent handle 59 are secured together, for example, by welding. Just beyond the point where rod 63 is secured to rods 61 and 62, rod 63 is bent to extend outwardly toward the periphery of pan 52. At the point below the intersection of rod 63 with the periphery of pan 52, rod 63 is bent so that it extends as two generally parallel strands longitudinally of pans 51 and 52. At the point where the parallel strands intersect the periphery of pan 51, rod 63 is bent to extend across the bottom of pan 51. Rod 61 is secured to pans 51 and 52 by welding, at each intersection of the rod with the periphery of the pans. The portion of rod 63 which extends between the two parallel strands across the bottom of pan 51 is secured to the ends of rods 61 and 62.

Rods 66 and 67, forming legs 57, have ends secured to wire 63, at the intersections of wire 63 with the peripheral portions of pans 51 and 52 which are remote from the intersecting portions of walls 53 and 54, i.e., rods 66 and 67 are connected to rod 63 adjacent handle 59 and at the portion of wire 63 most remote from the handle. Rods 66 and 67 are formed with vertical, generally parallel leg portions, connected to each other by horizontally extending base portions which run generally parallel to the bottom panels 55 and 56 of the pans and bear against bottom 16 of vat 11 when the assembly of FIGS. 3–5 is placed in the deep fat fryer vat. The leg portions of wires 66 and 67 are tapered outwardly somewhat, to provide a wide base for the assembly of FIGS. 3–5.

The assembly of FIGS. 3–5 is used to cook funnel cakes in substantially the same manner as described supra with regard to the assembly of FIGS. 1 and 2. When it is no longer necessary to cook funnel cakes in a deep fat fryer with the assembly of FIGS. 3–5, the assembly is removed entirely from deep fryer vat 11 and stowed. Then the deep fryer vat 11 can be used for other purposes; for example, basket 14 can be inserted into the vat to cook french fried potatoes.

While there have been described and illustrated several specific embodiments of the invention, it will be clear that variations in the details of the embodiments specifically illustrated and described may be made without departing from the true spirit and scope of the invention as defined in the appended claims. For example, the number of segments in pan assembly 41 can be increased or decreased as desired, as can the number of circular pans secured together. In addition, the geometric configuration of the pan assembly is not limited to the illustrated rectangular and circular shapes. Also, the leg arrangement of FIGS. 3–5 can be used with the rectangular pan structure of FIGS. 1 and 2.

I claim:

1. Apparatus for cooking funnel cakes comprising a deep fat fryer, a pan assembly having a bottom and sides located in the fryer, the bottom having a substantially solid portion, the pan assembly being perforated so that liquid drains from the pan assembly into the fryer when the pan assembly is removed from the fryer, means for controlling the height of the bottom of the pan assembly relative to the surface of a hot liquid cooking oil bath in a vat of the fryer so that: (1) the liquid covers the bottom while top edges of the sides are above the level of the liquid, and (2) the batter when continuously poured into the pan assembly hits the solid bottom portion of the pan assembly and rises in the oil to form a unitary mass that floats in the oil without sticking to the bottom and is confined by the sides as it expands, the deep fat fryer including a perforated basket having a top edge, the height controlling means including hangers on the pan assembly selectively connected to the top edge to hold the pan assembly in place on the basket.

2. Apparatus for cooking funnel cakes in hot liquid cooking oil in a vat of a deep fat fryer comprising a pan assembly having a bottom and sides adapted to be located in the fryer, the bottom having substantial solid portions, the pan assembly being perforated so that liquid drains from the pan assembly into the fryer when the pan assembly is removed from the fryer, means for controlling the height of the bottom of the pan assembly relative to the surface of a hot liquid cooking oil bath in a vat of the fryer so that: (1) the liquid covers the bottom while top edges of the sides are above the level of the liquid, and (2) the batter when continuously poured into the pan assembly hits the solid bottom portion of the pan assembly and rises in the oil to form a unitary mass that floats in the oil without sticking to the bottom and is confined by the sides as it expands, the deep fat fryer including a perforated basket adapted to be inserted into the fryer vat, the basket having a top edge, the height controlling means including hangers on the pan assembly selectively connected to the top edge to hold the pan assembly in place on the basket.

3. The apparatus of claim 1 wherein the hangers maintain the bottom of the pan assembly from ½" to 2" below the oil surface.

4. The apparatus of claim 1 wherein the hangers maintain the bottom of the pan assembly approximately 1½ below the oil surface.

5. The apparatus of claim 1 wherein the basket is generally shaped as a parallelipiped having an open rectangular top and the bottom of the pan assembly has a substantially rectangular shape generally corresponding with the shape of the open top of the basket and dimensioned to be slightly smaller than the open top so that the pan assembly can fit into the open top, the sides including exterior walls and at least one vertical divider between adjacent segments of the pan assembly, the vertical divider extending at right angles between a pair of parallel exterior walls.

6. The apparatus of claim 2 wherein the basket is generally shaped as a parallelipiped having an open rectangular top and the bottom of the pan assembly has a substantially rectangular shape generally corresponding with the shape of the open top of the basket and dimensioned to be slightly smaller than the open top so that the pan assembly can fit into the open top, the sides including exterior walls and at least one vertical divider between adjacent segments of the pan assembly, the vertical divider extending at right angles between a pair of parallel exterior walls.

* * * * *